Figure 1:
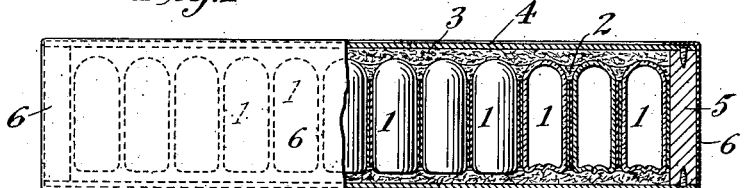

C. J. COLEMAN.
HEAT INSULATING WALL.
APPLICATION FILED MAR. 23, 1908.

946,773.

Patented Jan. 18, 1910.

Witnesses:

Inventor:
Clyde J. Coleman
by Henry D. Williams
Attorney.

UNITED STATES PATENT OFFICE.

CLYDE J. COLEMAN, OF NEW YORK, N. Y.

HEAT-INSULATING WALL.

946,773.   Specification of Letters Patent.   Patented Jan. 18, 1910.

Application filed March 23, 1908. Serial No. 422,815.

*To all whom it may concern:*

Be it known that I, CLYDE J. COLEMAN, a citizen of the United States, residing at the borough of Manhattan, city of New York, in the county of New York and State of New York, have invented a certain new and useful Improvement in Heat-Insulating Walls, of which the following is a specification, reference being had therein to the accompanying drawings, forming part thereof.

My invention relates generally to heat insulation and relates particularly to heat insulating walls and is especially adapted for heat insulating walls of refrigerator cars, but may be employed for other purposes such as in cold storage buildings and household refrigerators and the like.

The objects of my invention are to secure highly effective heat insulation, flexibility in the heat insulating wall, and simplicity and economy of construction, and my invention also has other objects and advantages which will appear from the following description.

My present invention is related in a general way to my former invention which is the subject of my application for Letters Patent, Serial No. 397,071, filed October 12, 1907, for heat insulation, and this present invention is also generally related to two other of my inventions for which applications for Letters Patent are executed on even date herewith and are filed in the Patent Office contemporaneously herewith, as Case 3 and Case 4. My said inventions all employ an assemblage of vacuum inclosing bodies as a principal part of the heat insulating construction. The high efficiency of a vacuum as a heat insulator has been long known, but prior to my said inventions no practical embodiment of the same has been made in heat insulating walls of any substantial size adapted to the uses above noted.

My present invention is directed to the production of a heat insulating wall which may be of any desired dimensions and will have sufficient flexibility to accommodate itself to any bending or twisting strains to which such a wall may be subjected in use.

To these ends my invention includes an assemblage of elongated vacuum inclosing bodies arranged transversely to the wall and with a low heat conductive filler for the interstices between the vacuum inclosing bodies.

My invention also includes a hermetically sealed envelop or box inclosing a group of the assembled vacuum inclosing bodies to protect them and the interposed filling from moisture.

My invention also includes a heat barrier formed by an assemblage of such sealed envelops or boxes.

My invention also includes several details of construction and other advantageous features which will hereinafter appear.

I will now describe my invention with reference to the accompanying drawings and will thereafter point out my invention in claims.

Figure 3:
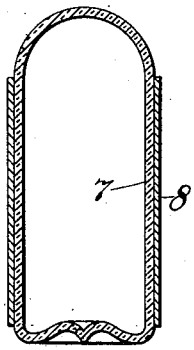
Figure 2:
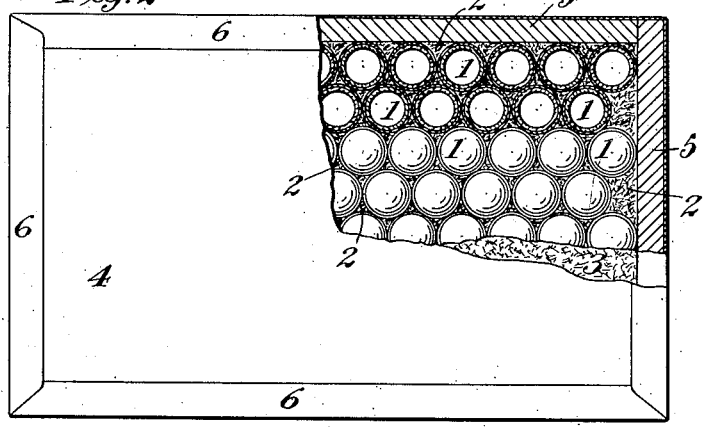
Figure 4:
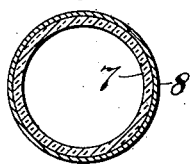
Figure 5:
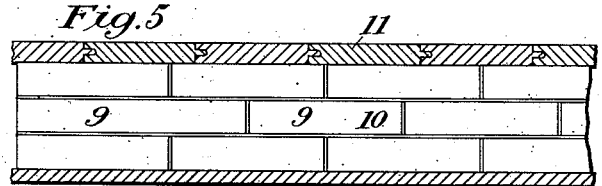
Figure 6:
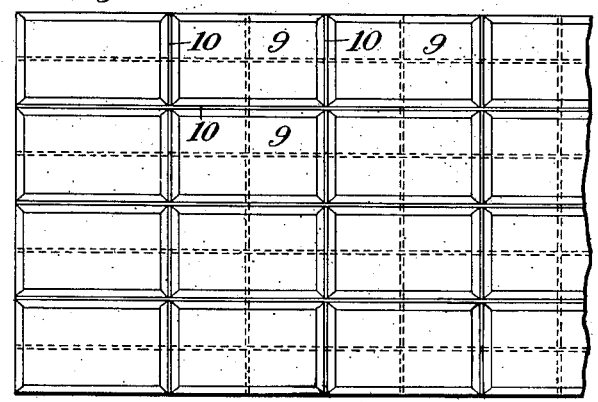

Figure 1 is an edge view partly in section of one of the hermetically sealed envelops and its contents. Fig. 2 is a face view of the same partly in section. Fig. 3 is an enlarged longitudinal section of one of the vacuum inclosing cylinders or bodies. Fig. 4 is a transverse section of the same looking in an upward direction. Fig. 5 is a top or plan view on a reduced scale of a heat insulating wall embodying my invention, the side supports of the wall being in horizontal section. Fig. 6 is an elevation of the wall shown in Fig. 5 with the front plate or support omitted.

In the embodiment of my invention illustrated in the drawings elongated vacuum inclosing cylinders 1 are compactly assembled in contact one with another and are arranged transversely of the wall and shown in the drawings as perpendicular thereto with a low heat conductive filler 2 filling the interstices between the cylinders, such filler consisting of fragmentary material such as disintegrated wool felt, which has been found very satisfactory for the purpose. Cushioning plates 3 formed of sheets of heat insulating material such as wool felt are placed in contact with the opposite ends of the vacuum inclosing cylinders 1. A hermetically sealed inclosing envelop or box, shown as rectangular in form, surrounds and incloses a group of assembled cylinders 1, including the interstitial filler 2 and the heat insulating cushioning plates 3. The inclosing envelop has metal sides 4, and edge or border portions 5, which extend transversely of the wall, of suitable low heat conductive material indicated in the drawings as wood. The metal sides 4 are shown as secured to the wood border by screws. To effect an airtight and watertight seal of the envelop or box, a strip or border 6 of suitable flexible material such as waterproofed canvas or indurated fiber covers the wood edges 5 and extends over the joint between the edge portion 5 and the metal sides 4 and 5 is lapped down upon the latter as indicated in the drawings and is adherently secured in place in an airtight and watertight manner. The hermetically sealed envelop effectually protects its contents from air drafts and from moisture, particularly from moisture which could otherwise penetrate the heat insulating sheets 3 and the filler 2 and condense on the vacuum inclosing cylinders 1 and substantially reduce the heat insulation.

In assembling the vacuum inclosing cylinders 1 in the envelop or box, one of the heat insulating cushioning plates 3 is first inserted through an open side of the envelop, and then the cylinders 1 are placed in position in contact one with another in their most compact arrangement (Fig. 2). The filler 2 of wool felt is then inserted into and compacted in the interstitial spaces between the cylinders 1, and the remaining plate 3 is then placed in position on the ends of the cylinders, after which the open side of the envelop is closed by attaching the metal side 4 and is hermetically sealed by securing in place the border strip 6.

The vacuum inclosing cylinders 1 each comprise a vitreous pressure-resisting shell 7 (Figs. 3 and 4) and a cushioning sleeve 8 surrounding the shell 7 and adherently secured thereto, as with sizing. The sleeve 8 is composed of low heat conductive material such as paper, and may be tissue paper, but is shown in the drawings as of exaggerated thickness for the sake of clearness. The vitreous material of the shell 7 permits the shell to be sealed to inclose the vacuum, and such shells are indicated in the drawings as formed of glass.

One end of the shell 7 is shown as of hemispherical form and the other end is provided with a sealing tip which is located in a depression, as most clearly shown in Fig. 3, and projects outwardly from the bottom of the depression and is protected by a surrounding shoulder forming the rim or border of the depression, so that it is out of the way and protected from injury.

To prevent the passage of radiant heat through the vacuum space and thus provide additional heat insulation, reflecting surfaces are provided for the shells 7, and such reflecting surfaces are secured by silvering the insides of the shells, but the silvering may be applied to the outsides or to both sides of the shells if desired.

The hermetically sealed envelop besides protecting its contents from moisture, forms therewith a heat insulating block or box member 9 (Figs. 5 and 6) which is convenient of transportation and a number of which may be conveniently laid up or assembled to form a heat insulating wall as shown in Figs. 5 and 6. The blocks 9 are built up in a plurality of layers, shown as three, the members or blocks 9 of which overlap or break joints one with another transversely of the wall as shown in the drawings. Heat insulating gaskets 10 composed of any suitable material are interposed between the layers and also between the blocks or envelops in the layers. The boxes 9 are held in place in the wall by supports 11 and 12 (Fig. 5) of which the support 11 may be the wood outer siding and the support 12 may be the ceiling or inner facing of the heat insulating wall of a refrigerator car or of a cold storage building or similar structure.

The transverse arrangement in respect to the wall of the vacuum inclosing cylinders 1 gives great flexibility to the wall and for this reason and also because of the adaptability of the envelops or boxes 9 to this class of work my present invention is particularly well adapted for embodiment in refrigerator car construction, but is as well adapted for cold storage buildings and the like.

It is obvious that various modifications may be made in the construction shown and above particularly described within the principle and scope of my invention.

I claim:—

1. In a heat insulating wall, a heat barrier comprising elongated vacuum inclosing bodies arranged transversely of the wall, a low heat conductive filler interposed between the bodies, and a hermetically sealed envelop inclosing the bodies and the filler.

2. In a heat insulating wall, a heat barrier comprising vacuum inclosing cylinders arranged transversely of the wall and adjacent one with another, a low heat conductive filler filling the interstices between the cylinders, sheets of low heat conductive plates at the ends of the cylinders, and a hermetically sealed envelop inclosing the cylinders and the filler and the plates.

3. In a heat insulating wall, a heat barrier comprising elongated vacuum inclosing bodies arranged transversely of the wall, a low heat conductive filler interposed between the bodies, a hermetically sealed envelop inclosing the bodies and the filler, such envelop being composed of low heat conductive material in its portions which extend transversely to the wall.

4. In a heat insulating wall, a heat barrier comprising vacuum inclosing cylinders arranged transversely of the wall and adjacent one with another, and a low heat conductive filler filling the interstices between the cylinders, each cylinder being provided with a cushioning sleeve adherently secured thereto.

5. A vacuum inclosing unit for heat insulating construction comprising a cylindrical shell composed of vitreous material and provided at one end with a depression surrounded by a shoulder and provided with a sealing tip projecting outwardly from the bottom of the depression and protected by the surrounding shoulder.

6. A vacuum inclosing unit for heat insulating construction comprising a cylindrical shell composed of vitreous material and provided at one end with a depression surrounded by a shoulder and provided with a sealing tip projecting outwardly from the bottom of the depression and protected by the surrounding shoulder, the other end of the shell opposite to the sealing tip being of substantially hemispherical contour.

7. A heat insulating wall comprising a plurality of hermetically sealed envelops assembled to form the wall, each envelop inclosing an assemblage of vacuum inclosing units.

8. A heat insulating wall comprising a plurality of hermetically sealed envelops assembled to form the wall, each envelop inclosing an assemblage of vacuum inclosing units together with a low heat conductive filler interposed in the interstices between the units.

9. A heat insulating wall comprising a plurality of hermetically sealed envelops assembled to form the wall, each envelop inclosing an assemblage of vacuum inclosing units together with a low heat conductive filler interposed in the interstices between the units, and supports at the sides for holding the envelops in place in the wall.

10. A heat insulating wall comprising a plurality of hermetically sealed envelops assembled in a plurality of layers to form the wall, and low heat conductive gaskets interposed between the layers and between the envelops in the layers, each envelop inclosing an assemblage of vacuum inclosing units together with a low heat conductive filler interposed in the interstices between the units.

11. In a heat-insulating wall, a heat barrier comprising elongated frangible vacuum-inclosing bodies arranged transversely of the wall and adjacent one with another, and cushioning means interposed between the bodies.

12. In a heat-insulating wall, a heat barrier comprising frangible vacuum-inclosing cylinders arranged transversely of the wall and adjacent one with another, cushioning means interposed between the cylinders, and a low heat-conductive filler filling the interstices between the cylinders.

In testimony whereof I affix my signature in presence of two witnesses.

CLYDE J. COLEMAN.

Witnesses:
   WM. ASHLEY KELLY,
   BERNARD COWEN.